United States Patent Office 3,480,221
Patented Nov. 25, 1969

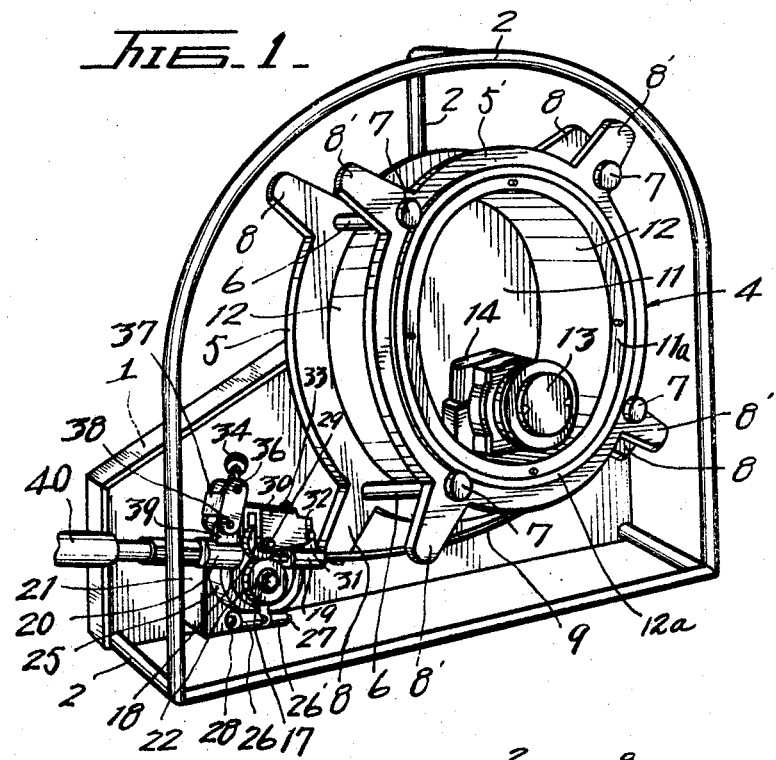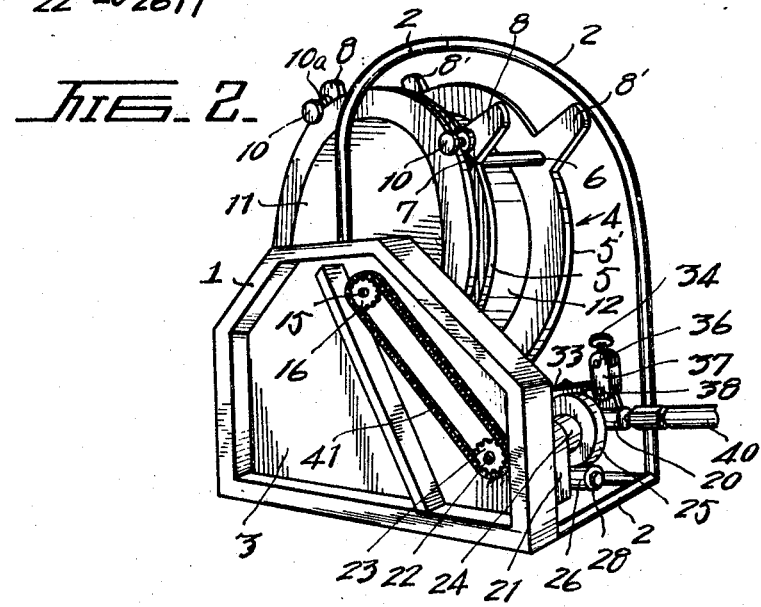

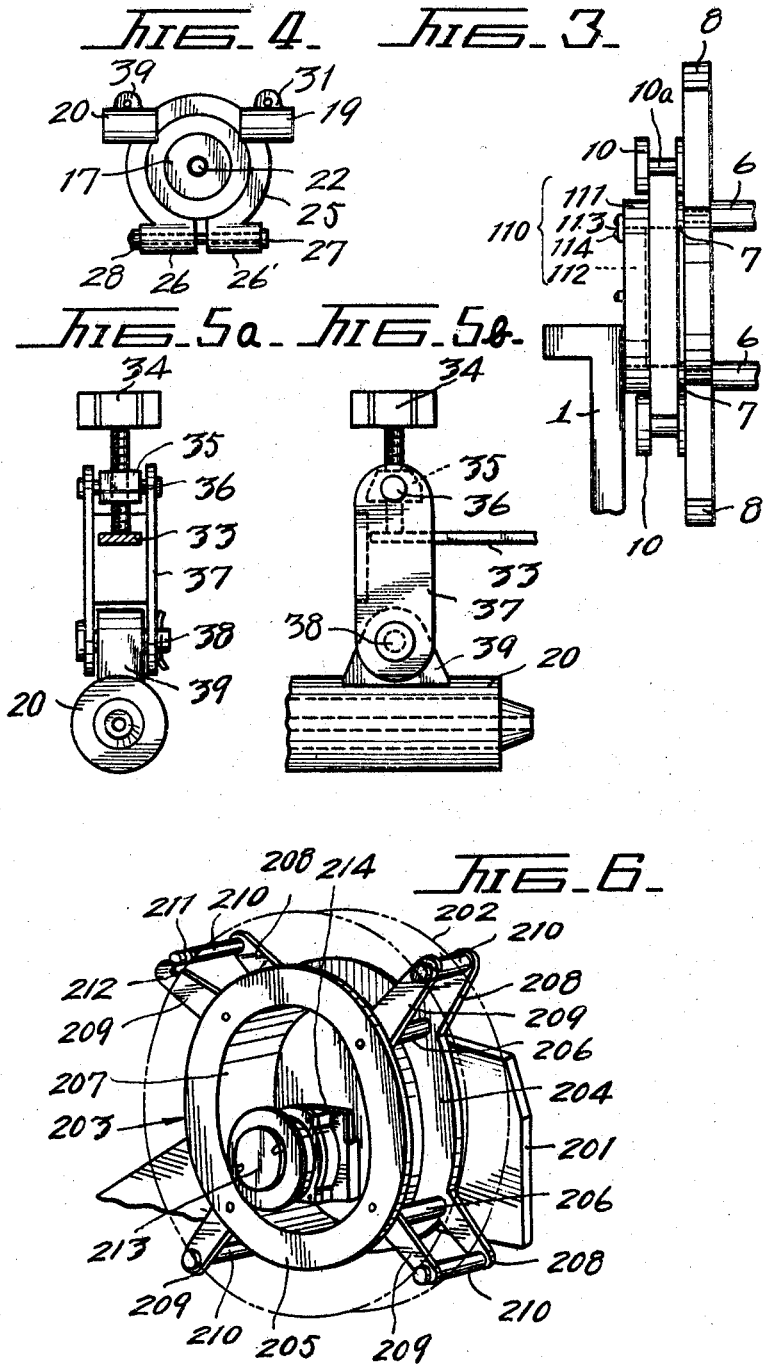

3,480,221
WIRE FEED APPARATUS
Shigeo Sekino, Kyoto-fu, Japan, assignor to The Osaka Transformer Co., Ltd., Osaka, Japan, a company of the prefecture of Osaka, Japan
Filed Aug. 16, 1967, Ser. No. 661,024
Claims priority, application Japan, Aug. 19, 1966, 41/77,880
Int. Cl. B65h 51/08
U.S. Cl. 242—54                              5 Claims

ABSTRACT OF THE DISCLOSURE

A wire feed apparatus having a simplified and compact construction in which a wire reel, a wire feed roll and a pressure roll are mounted on a common support structure and a wire feed electric motor and a reduction gear are disposed within an opening defined by a wire electrode coil supported on the wire reel.

Background of the invention

A typical prior art wire feed apparatus to be employed in conjection with an automatic or semi-automatic electric-arc welding apparatus generally comprises a wire reel, a wire feed electric motor, a reduction gear for reducing the rotational rate of the motor, a wire feed roll driven by the electric motor through the reduction gear, and a pressure roll disposed in opposition to the feed roll for cooperating with the latter in nipping and advancing a continuous length of wire electrode as the wire electrode is payed out of the wire reel. In such a wire feed apparatus, a length of wire electrode supported on the wire reel in a coil form is continuously payed out of the wire reel as the wire feed roll is continuously driven by the electric motor and is fed into the welding torch. However, in the prior art wire feed apparatus as mentioned above, the wire reel and the wire drive mechanism including the wire feed electric motor, reduction gear and wire feed and pressure rolls are disposed on separately different locations in the wire feed apparatus. However, since the combined volume and weight of the wire reel on which the wire electrode are supported and the wire drive mechanism account for a greater percentage of the whole welding apparatus including the wire feed apparatus, when the wire reel and the wire drive mechanism are provided on separately different locations in the wire feed apparatus, the entire welding apparatus including the wire feed apparatus is inevitably a large size structure. And such a wire feed apparatus including the separately located wire reel and wire drive mechanism as mentioned above jeopardizes the proper weight balance of the entire welding apparatus thereby to make it very inconvenient to move and/or carry about the welding apparatus.

For example, when a great number of workpieces having relatively short weld lines are welded in a welding operation, the welding apparatus has to be frequently moved and/or carried about. Therefore, when a large and heavy welding apparatus including the above-mentioned prior art wire feed apparatus is moved and/or carried about in performing a welding operation, such an operation inevitably requires a large space and a lot of labors. Accordingly, the welding operation employing such a welding apparatus can not be performed smoothly and efficiently.

Summary of the invention

Therefore, the principal object of the present invention is to provide a wire feed apparatus which has a small size and a well balanced weight distribution and which can be easily moved and/or carried about.

Another object of the present invention is to provide a wire feed apparatus in which a continuous length of wire electrode can be smoothly payed out of the wire reel.

Basically, the present invention provides a wire feed apparatus which comprises a wire reel having a continuous length of wire electrode supported thereon in a coiled form and an opening surrounded by the inner periphery of said coiled wire electrode; a wire feed electric motor disposed within said opening; a reduction gear disposed within said opening and operatively connected to said electric motor; wire paying-out means including a wire feed roll and a cooperating pressure roll which are disposed in a nip forming relation to each other adjacent to the wire paying-out portion of said wire reel; power transmission means for transmitting the rotational force of said reduction gear to said wire feed roll; and a support structure for supporting and holding said wire reel, wire feed electric motor, reduction gear and wire paying-out means as a unitary unit.

The above and other objects and advantages of the present invention will be more readily apparent to those skilled in the art from the following description when read in connection with the accompanying drawings.

Brief description of the drawings

FIG. 1 is a perspective view of one preferred embodiment of wire feed apparatus according to the present invention as seen on the right hand side thereof;

FIG. 2 is a perspective view of said embodiment of wire feed apparatus as seen on the left hand side thereof;

FIG. 3 is a side elevational view of a modified form of support structure which rotatably supports the wire reel;

FIG. 4 is a side elevational view of the wire paying-out direction adjustment device to be employed in connection with said wire feed apparatus;

FIG. 5a is a front elevational view of the pressure applying mechanism for the pressure roll to be employed in connection with said wire feed apparatus;

FIG. 5b is a side elevational view of said pressure applying mechanism of FIG. 5a; and FIG. 6 is a perspective view of a modified form of wire reel to be employed in connection with said wire feed apparatus.

Preferred embodiments of the invention

The present invention will be now described referring to the figures of the accompanying drawings in which two preferred embodiments of the present invention are illustrated. The illustrated wire feed apparatus generally comprises an upright trapezoidal support plate 1 having on one side a thick heavy duty wire-made frame 2 in a cage shape secured thereto and a shallow trapezoidal recess 3 on the side opposite to the cage-like frame. The cage-like wire frame 2 surrounds various component parts which are supported on the support plate 1 on the same side as the cage-like frame 2 and the trapezoidal recess 3 is defined by the surrounding trapezoidal peripheral ridge. The recess 3 is normally closed and sealed by a detachable suitable cover (not shown).

A wire reel 4 generally comprises a pair of opposite annular plates 5 and 5' which are connected in a spaced face to face relation to each other by means of a plurality of transverse connector bars 6 which extend through the two plates 5 and 5' at angularly spaced points in the outer periphery of the plates with an equal angular space between the adjacent connector bars. The annular plate 5 is provided at the above-mentioned angularly spaced points in the outer periphery where the connector bars 6 are provided with four outwardly and radially extending ears 8 through which one end of the respective connector bars 6 extend and the other annular plate 5' is also provided with the corresponding number of similar outwardly and radially extending ears 8' at the points corresponding to those at which the ears 8 of the annular plate 5 are provided and the other ends of the connector bars 6 extend through the ears 8' of the second annular plate 5'. The extending opposite ends of each connector bar 6 are reduced in diameter and threaded and cap nuts 7 are threaded on the threaded opposite ends of the connector bar whereby the pair of annular plates 5 and 5' can be maintained in a predetermined spaced relation to each other by tightening the cap nuts 7 against the associated ends of the connector bars 6. A continuous length of wire electrode 9 is supported in the wire reel 4 in a coiled form around the connector bars 6 and the coiled wire electrode is effectively prevented from collapsing by the aid of the ears 8 and 8' on the opposite sides thereof.

The wire reel 4 further comprises four rollers 10 rotatably supported on the stub shafts (not shown) extending outwardly of the associated ears 8 on the annular plate 5. Each of the rollers 10 is provided in the center of its peripheral surface with an annular groove 10a and the groove 10a receives the peripheral edge of a circular track plate 11 which is welded or bolted to the inner side of the support plate 1 whereby the rollers 10 may frictionally rotate along the periphery of the circular track plate 11 by engagement of the grooves 10a and the circular plate peripheral edge. The rollers 10 are preferably formed of a suitable electrically insulating material so that the wire reel 4 may be electrically insulated from the circular track plate 11. The circular track plate 11 gradually and radially reduces its thickess from a point inwardly spaced from the outer peripheral edge toward the outer peripheral edge so that the rollers 10 may be maintained spaced from the opposite side of the support plate 1 and rotate freely as the rollers rotate along the outer peripheral edge of the circular track plate 11. As shown in FIG. 3, alternatively, the circular track plate 110 may be formed by applying an electrically insulating annular plate 112 around the outer peripheral edge of a metallic circular plate 111, by applying a suitable number of radially spaced straps 113 against one surface (the left hand side in FIG. 3) of the circular plate 111 and annular plate 112 bridging the adjacent areas of the circular and annular plates, and by bolting the circular and annular plates and straps together. The thus assembled circular plate 110 is secured to the adjacent side of the support plate 1 by welding or bolting. In the alternative form of the circular track plate, since the rollers 10 frictionally rotate along the outer peripheral edge of the insulating annular plate 112, the rollers may be formed of a suitable metal.

The wire reel 4 is further supported at its inner periphery by a cylindrical member 12 which engages the inner periphery of the opposite annular plates 5 and 5' and has an annular flange 12a adjacent to the inner peripheral edge of the annular plate 5' in a spaced relation to the latter and the flange 12a is provided with a suitable number of threaded bores at angularly spaced points thereon for receiving screws (not shown) which secure a circular panel plate (not shown) to the flange 12a.

A wire feed electric motor 13 and a reduction gear 14 are disposed in the inner cavity or opening of the wire reel 4 or within the inner cylindrical member 12. The casing of the electric motor 13 and the casing of the reduction gear 14 are integrally connected to each other by suitable means (not shown) so as to form a unitary unit and the casing of the reduction gear 14 is in turn bolted to the circular track plate 11. The output shaft 15 of the reduction gear 14 extends through the circular track plate 11 and the support plate 1 into the trapezoidal recess 3 and a sprocket 16 is fixedly mounted at the extreme end of the output shaft within the recess 3.

The wire electrode 9 is payed out from the wire reel 4 and adapted to pass through between opposing feed roll 17 and pressure roll 18 by the nipping action of the cooperating rolls 17 and 18 as the fed roll 17 is driven from the electric motor 13 through the transmission mechanism which will be described hereinafter. A wire electrode paying-out means includes an inlet guide tube 19 and an outlet guide tube 20 as well as the above-mentioned wire feed roll 17 and pressure roll 18. The feed roll 17 is mounted on a shaft 22 which is in turn supported by a gear box 21 secured to the support plate 1 and one end of the shaft extends through the support plate 1 into the trapezoidal recess 3 where the extreme end of the shaft has a sprocket 23 secured thereto.

As shown in FIG. 4, the inlet guide tube 19 and the outlet guide tube 20 are secured to one side of a substantially circular clamp 25 in an opposed and laterally spaced relation in the upper portion of the clamp which fits on an annular shoulder member 24 secured to the adjacent side of the gear box 21. The axis of the annular shoulder member 24 and that of the roll shaft 22 are aligned with each other. The clamp 25 is cut open at the base and a pair of opposite and spaced cylindrical members 26 and 26' are secured to the cut base. A tightening bar 27 extends through the aligned bores of the two cylindrical members 26 and 26' and has a nut 28 threaded on one threaded end of the bar so as to tighten the clamp 25 against the annular shoulder member 24. It should be noted that the line in which the inlet guide tube 19 and outlet guide tube 20 lie always contacts the periphery of the wire feed roll 17 at a tangent with respect to the latter. Therefore, when it is desired to adjust the position of the opposite inlet and outlet guide tubes 19 and 20 for the purpose of paying out the wire electrode 9 in a particular direction, the nut 28 is loosened so that the clamp 25 may be rotated on the annular shoulder member 24 to a predetermined angular distance corresponding to the predetermined particular paying-out direction for the wire electrode and after the rotation of the clamp 25 to the predetermined angular distance on the annular shoulder member 24 and the position of the inlet and outlet guide tubes have been adjusted as desired the nut 28 is again tightened so as to set the inlet and outlet guide tubes 19 and 20 in the adjusted position.

The above-mentioned pressure roll 18 is mounted on a shaft 29 which transversely extends through a U-shape section support frame member 30 which is in turn journalled at one end on the ear 31 of the inlet guide tube 19 by means of a stub shaft 32 extending through the opposite leg portions of the U-shape section support frame member 30 and the inlet guide tube ear 31. Accordingly, the pressure roll 18 may be rotated about the stub shaft 32 as the fulcrum so that the roll may come to engage and disengage from the opposite wire feed roll 17.

The pressure roll 18 includes a mechanism which causes the pressure roll to contact the opposite feed roll 17 with a predetermined pressure.

The mechanism comprises a leaf spring 33 having one end riveted to the top surface of the frame member 30 and a threaded bar 34 provided in such a position for pushing down the free end of the leaf spring 33 as shown in FIGS. 5a and 5b. The threaded bar 34 threadably engages the mating threaded bore in a member 35 disposd below the bar and having on the opposite sides a pair of laterally extending pins 36 rotatably supported on a support frame 37 which is in turn journalled at the lower end on the ear 39 of the outlet guide tube 20 by means of a transverse pin 38. Therefore, as the wire electrode 9 payed out from the wire reel 4 passes through the inlet guide tube 19, along the wire feed roll 17 and through the outlet guide tube 20, the above-mentioned mechanism is so arranged that the mechanism causes the pressure roll 18 to contact the opposing feed roll 17 in the nip defined by the two rolls so that the pressure roll 18 and feed roll 17 cooperate in nipping the moving wire electrode 9 and thereafter causes the support frame 37 to rotate about the pin 38 toward the pressure roll 18 whereby the threaded bar 34 may be positioned above the free end of the leaf spring 33 and then the threaded bar 34 is threadably driven through the threaded bore in the member 35 until the lower end of the threaded bar 34 contacts the free end of the leaf spring 33 which in turn pushes the pressure roll 18 toward the feed roll 17 with the wire electrode 9 nipped therebetween. The discharge end of the outlet guide tube 20 is reduced in diameter and threaded and a flexible conduit 40 is provided adjacent to the reduced diameter end of the outlet guide tube. The adjacent end of the flexible conduit 40 is also reduced in diameter and threaded and a suitable conventional connector tube having threaded inner peripheries at the opposite end portions connects between the adjacent ends of the outlet guide tube 20 and flexible conduit 40. The other end of the flexible conduit 40 is connected to a conventional welding torch (not shown). Therefore, as the wire feed roll 17 is driven by the electric motor 13 through the transmission mechanism, the wire electrode 9 which has been payed out of the wire reel 4 and passed through the inlet guide tube 19, the nip between the rolls 17 and 18 and the outlet guide tube 20 is guided into the flexible conduit 40 to be fed to the welding torch.

The means which transmits the driving power from the electric motor 13 to the wire feed roll 17 through the transmission mechanism including the reduction gear 14 comprises a chain 41 which is trained about the sprocket 16 and sprocket 23 within the recess 3 in the support plate 1. To describe the power transmission from the electric motor 13 to the wire feed roll 17 in detail, the power from the electric motor 13 is transmitted through the reduction gear 14, the output shaft 15 for the reduction gear, the sprocket and chain arrangement 16, 23 and 41 and the feed roll shaft 22 for the feed roller 17 to the feed roller on the shaft 22. The above-mentioned sprocket and chain arrangement 16, 23 and 41 may be replaced by any other suitable type of arrangement such as a pulley and belt arrangement or a gear train, for example, except for arrangements having the slip characteristics. Alternatively, the power transmission mechanism may be realized by providing difference in the number of teeth between the sprockets 16 and 23 so as to develop the speed reduction action or by providing another reduction gear in a midpoint between the opposite ends of the feed roll shaft 22 so that the main reduction gear 14 has a decreased reduction ratio thereby to rotate the output shaft 15 at a rate higher than a predetermined rotational rate. However, in practice, it is preferable to reduce the rotational rate of the feed roll 17 to a predetermined rotational rate by means of the reduction gear 14 so that the power transmission mechanism may be prevented from operating at a high speed.

FIG. 6 illustrates a modified form of wire reel according to the present invention and the modified wire reel 203 is adapted to receive a length of wire electrode 202 which has been previously coiled. The wire reel 203 comprises a circular plate 204 and an opposite annular plate 205 which are disposed in a spaced face to face relation to each other by means of four transverse connector bars 206 disposed between the two plates in an equally angular spaced relation to each other along the outer peripheral edges of the plates. As in the case of the first embodiment, the opposite ends of the connector bars 206 are reduced in diameter and extend through and welded to the plates 204 and 205. The circular plate 204 is welded on the outer side to the trapezoidal support plate 201 which is the same as the trapezoidal support plate 1 in the first embodiment and the annular plate 205 has a cylindrical boss 207 extending laterally from the inner periphery of the plate to the opposite or inner side of the circular plate 204 and welded to the circular plate side. Four ears 208 extend outwardly and radially from the outer periphery of the circular plate 205 in an equally angular spaced relation to each other and four ears 209 extend outwardly and radially from the outer periphery of the annular plate 205 in an equally angular spaced relation to each other and the ears 209 are pivoted at the lower ends on the adjacent reduced diameter ends of the respective connector bars 206. As in the case of the first embodiment, the respectively pair of opposite ears 208 and 209 are provided in the corresponding or aligned positions. Each ear 208 has at one end a transverse rod 210 secured thereto in a parallel relation to the corresponding transverse connector bar 206 and the rod 210 is formed adjacent to the other end with an annular groove 211. Each ear 209 is formed adjacent to the free end with a notch 212 for engaging the corresponding annular groove 211 of the rod 210. Therefore, when the annular plate 205 is not connected to the opposite circular plate 204, the ears 209 in the annular plate 205 may be allowed to pivot about the connector bars 206 as the fulcrum. However, when the opposite plates 204 and 205 are connected to each other as shown in FIG. 6, the ears 209 may be allowed to pivot in only the counter-clockwise direction. When it is desired to place the pre-coiled wire electrode 202 which has an inner diameter larger than a circle defined by the transverse connector bars 206 on the wire reel 203, the ears 209 of the annular plate 205 are first pivoted about the respective flucrum connector bars 206 in the counter-clockwise direction (as seen in FIG. 6) until the ears 209 move inwardly from the outer periphery of the annular plate 205 and then the precoiled wire electrode 202 is placed on the radially spaced connector bars 206. Thereafter, the ears 209 are pivoted back in the opposite or clockwise direction until the notches 212 in the ears 209 engage the corresponding annular grooves 211 in the rods 210 whereby the pre-coiled wire electrode 202 is held in position in the wire reel 203. Since the wire reel 203 is fixedly secured to the trapezoidal support plate 101 while the beginning end of the pre-coiled wire electrode 202 is free, when the terminal end of the wire electrode is pulled out of the remaining coiled electrode portion, the wire electrode is gradually payed out of the coil as the coil is rotating about the connector bars 206.

The wire feed electric motor 213 and reduction gear 214 are disposed within the inner circular cavity of the pre-coiled wire electrode 202 or within the opening of the cylindrical boss 207 of the annular plate 205. The casing of the wire feed electric motor 213 and the casing of the reduction gear 214 are integrally connected to each other so as to form a unitary unit. The casing of the reduction gear 204 is screwed to the inner side of the circular plate 204.

Preferred embodiments of the present invention are as described above, but the illustrated embodiments may be easily modified within the scope of the present invention without departing from the spirit of the invention.

For example, the pair of opposite circular or annular plates which constitute the principal components of the wire reel may be regular polygonal shapes including a regular triangle and a square shape. And the wire reel may be directly rotated by the wire feed electric motor through the transmission of power from the motor. Furthermore, the present invention may be equally applied to either the semi-automatic welding operation in which the welding torch is manually maneuvered along the weld line or to the automatic welding operation in which the welding torch, welding power supply and wire feed apparatus are integrally mounted on a movable truck.

While two preferred embodiments of the invention have been shown and described in detail it will be understood that they are for the purpose of illustration only and are not to be taken as a definition of the scope of the invention, reference being had for this purpose to the appended claims.

What is claimed is:

1. A compact, unitary wire feed apparatus comprising a frame supported wire reel having an inner hub provided with a central bore and a continuous length of wire electrode supported thereon in a coiled form, a wire feed electric motor and a reduction gear operatively connected thereto disposed within said central bore, wire paying-out means including a wire feed roll and a mutually cooperatively associated pressure roll disposed in a nip forming relation and being secured to said frame, means for transmitting the rotational force of said reduction gear to said wire feed roll, circular plate means secured to said frame, and a plurality of rollers affixed to said wire reel and guided by said circular plate means whereby said rollers rotate along the peripheral edge of said circular plate means as said wire is payed out of said wire reel.

2. The compact wire feed apparatus according to claim 1, wherein said electric motor and said reduction gear are provided with casings integrally connected to each other, and the reduction gear casing is fastened to said circular plate means.

3. The compact wire feed apparatus according to claim 1, wherein said wire reel is provided with a plurality of ears fixedly secured to and radially extending outwardly from the outer periphery of one side of said wire reel, a set of corresponding ears pivotably mounted adjacent to and radially extending from the outer periphery of the other side of said wire reel in opposed relationship to the ears on said one side whereby said pivotably mounted ears are rotated to positions inward from the outer peripheral edge so as to permit the placement of a pre-coiled wire electrode on said wire reel and rotated back to their original positions so as to maintain said coiled wire electrode captive on said wire reel.

4. The compact wire feed apparatus according to claim 1, wherein said wire reel is adapted to rotate by a portion of the rotational force of said wire feed electric motor.

5. The compact wire feed apparatus according to claim 1, wherein said means for transmitting comprises a sprocket mounted on an output shaft extending outwardly from said reduction gear, a cooperating sprocket mounted on a driven shaft extending from said feed roll, and an endless chain connecting said sprockets.

References Cited

UNITED STATES PATENTS

| | | | |
|---|---|---|---|
| 2,188,070 | 1/1940 | Baird et al. | 242—129 |
| 2,573,868 | 11/1951 | Newell | 242—86.2 X |
| 3,199,803 | 8/1965 | Mattson | 242—78.6 X |
| 3,246,859 | 4/1966 | Martin. | |
| 3,395,308 | 7/1968 | Meyer | 242—129 X |

NATHAN L. MINTZ, Primary Examiner